United States Patent [19]

Thornton

[11] 4,448,102
[45] May 15, 1984

[54] COMPOUND MITER SAW STAND

[76] Inventor: Jack L. Thornton, P.O. Box 222400, Carmel, Calif. 93922

[21] Appl. No.: 443,090

[22] Filed: Nov. 19, 1982

[51] Int. Cl. ............................. B27B 9/04; B27G 5/02
[52] U.S. Cl. .................................. 83/471.1; 83/471.3; 83/473; 83/574
[58] Field of Search ..................... 83/574, 471.1, 471.2, 83/471.3, 472, 473, 743

[56] References Cited

U.S. PATENT DOCUMENTS

| | | | |
|---|---|---|---|
| 1,457,492 | 6/1923 | Bloodgood | 83/574 X |
| 2,770,265 | 11/1956 | Pollock | 83/574 X |
| 2,803,271 | 8/1957 | Shaw | 83/574 X |
| 2,911,017 | 11/1959 | Holder | 83/574 |
| 4,181,057 | 1/1980 | Bassett | 83/471.3 |

Primary Examiner—Frank T. Yost

Attorney, Agent, or Firm—Robert K. Rhea

[57] ABSTRACT

A miter saw guide for making miter cuts on a workpiece comprising an upright rectangular stand supporting a pair of horizontal plates at its respective end portions. An upright bridge assembly transversely spans the frame between the plates and defines a workpiece travel path. A track assembly extends longitudinally of the frame between the bridge and workpiece path and overlies the plates at its respective end portions. Turntable bearing means connect the track assembly to the bridge and forms a vertical axis for horizontal pivoting movement of the track assembly in opposing directions. A cradle is supported by the track assembly for to and fro longitudinal movement. At least one electric miter hand saw is secured to the saw cradle with its cutting blade intersecting the workpiece path during cradle movement.

10 Claims, 10 Drawing Figures

COMPOUND MITER SAW STAND

BACKGROUND OF THE INVENTION

1. Field of the Invention

The present invention relates to apparatus for cutting lumber and more particularly to a saw guiding assembly for forming cuts on selected angles on the ends of a workpiece.

This apparatus is particularly useful in making angular cuts on wood framing members for building roof and floor trusses, or the like. It is current practice to prefabricate roof and floor trusses and assemble them as units of predetermined dimension to be transported and erected at the building site rather than fabricate the trusses at the construction site.

This invention provides a workpiece support and saw guiding assembly for forming angular cuts on the truss braces and materially reduces the time and labor cost of cutting and assembling trusses at the construction site, however, this apparatus may be used at the construction site, if desired.

2. Description of the Prior Art

Prior patents generally disclose portable hand saw mitering guides comprising a workpiece supporting stand or table having an overlying saw shoe guide longitudinally slidably supporting a portable miter saw in which the guide is usually secured by a pintle at one side of the table or stand for horizontal swinging movement about the pintle in forming angular cuts on a workpiece.

This invention is distinctive over prior patents by providing an upright framework having a horizontal transverse workpiece path extending through the framework for receiving a workpiece to be sawed. A track assembly extends transversely of the workpiece path and slidably supports a saw carriage having a pair of saws secured thereto for intersecting the workpiece path when the carriage is moved to and fro longitudinally of the tract assembly. The track assembly is supported centrally of the framework by a bearing assembly secured to an overhead bridge assembly parallel with the workpiece path.

SUMMARY OF THE INVENTION

An upright open rectangular framework forms a stand horizontally supporting a pair of track assembly support plates at respective ends of the stand. Upright post assemblies, at each side of the stand, define a horizontal workpiece travel path and support a bridge assembly extending transversely of the stand medially its length. An elongated track assembly extends between and slidably overlies the respective track supporting plates. Medially its ends, the track assembly is pivotally connected with the bridge assembly, medially its ends, by turntable bearing means for horizontal pivoting movement about a vertical axis centrally of the stand. Toggle link clamp means lock the track assembly to its supporting plates at selected angular positions relative to the axis of the workpiece travel path. A saw cradle assembly is longitudinally slidably supported by the track assembly with a pair of portable type electric hand saws secured to its respective end portions and normally disposed on opposing sides of the workpiece travel path.

The principal object of this invention is to provide a compound miter saw stand having a workpiece travel path and overlying track and saw cradle assemblies for guiding opposing saws across the workpiece travel path and forming predetermined angular cuts on the end of a workpiece disposed in the travel path which minimizes handling of the workpieces between cooperating angular cuts.

DESCRIPTION OF THE PREFERRED EMBODIMENT

Figure 1:
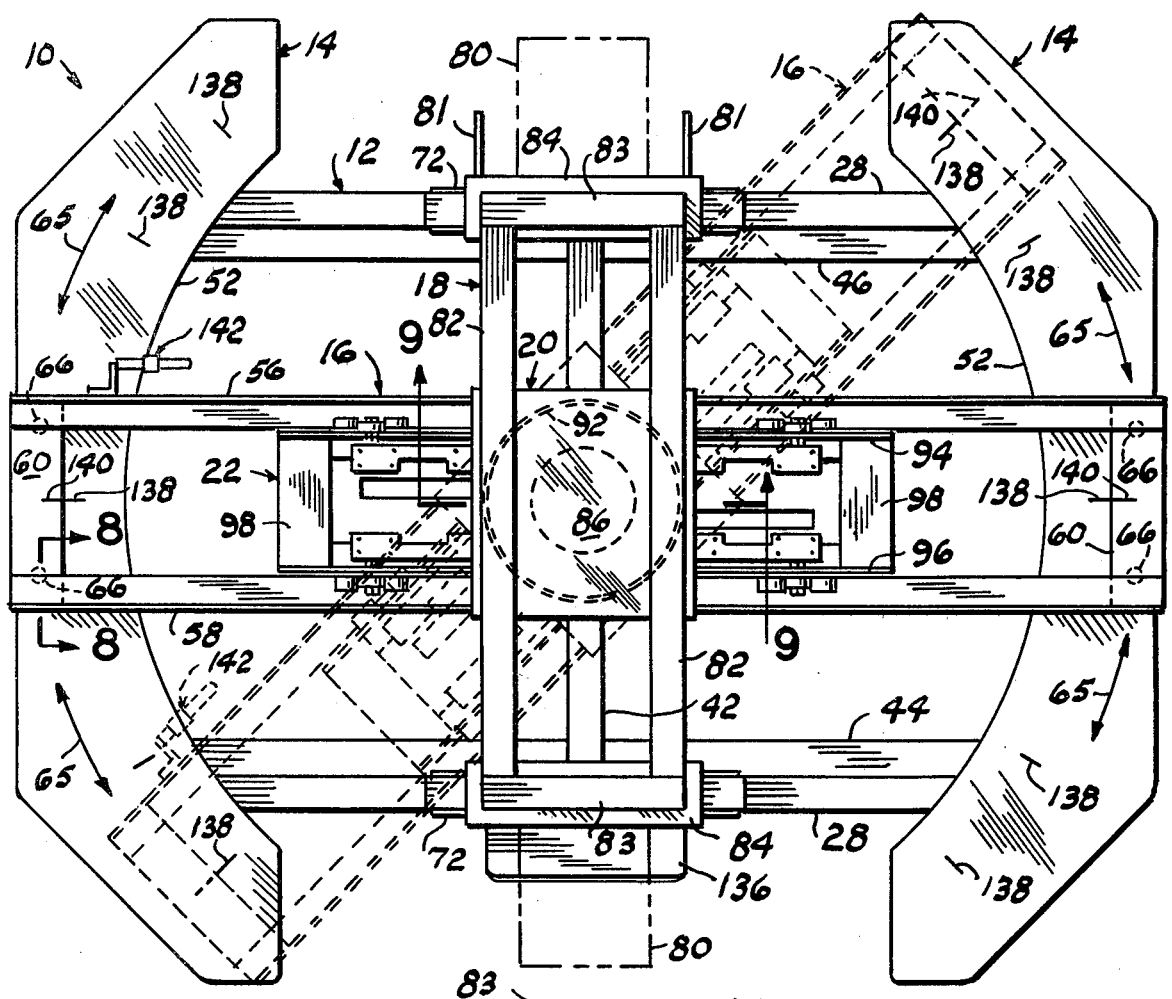
FIG. 1 is a top view of the device with the miter saws removed illustrating, by dotted lines, angular rotation of the saw track assembly and illustrating, by phantom lines, the relative position of a workpiece when in cutoff position.
Figure 2:
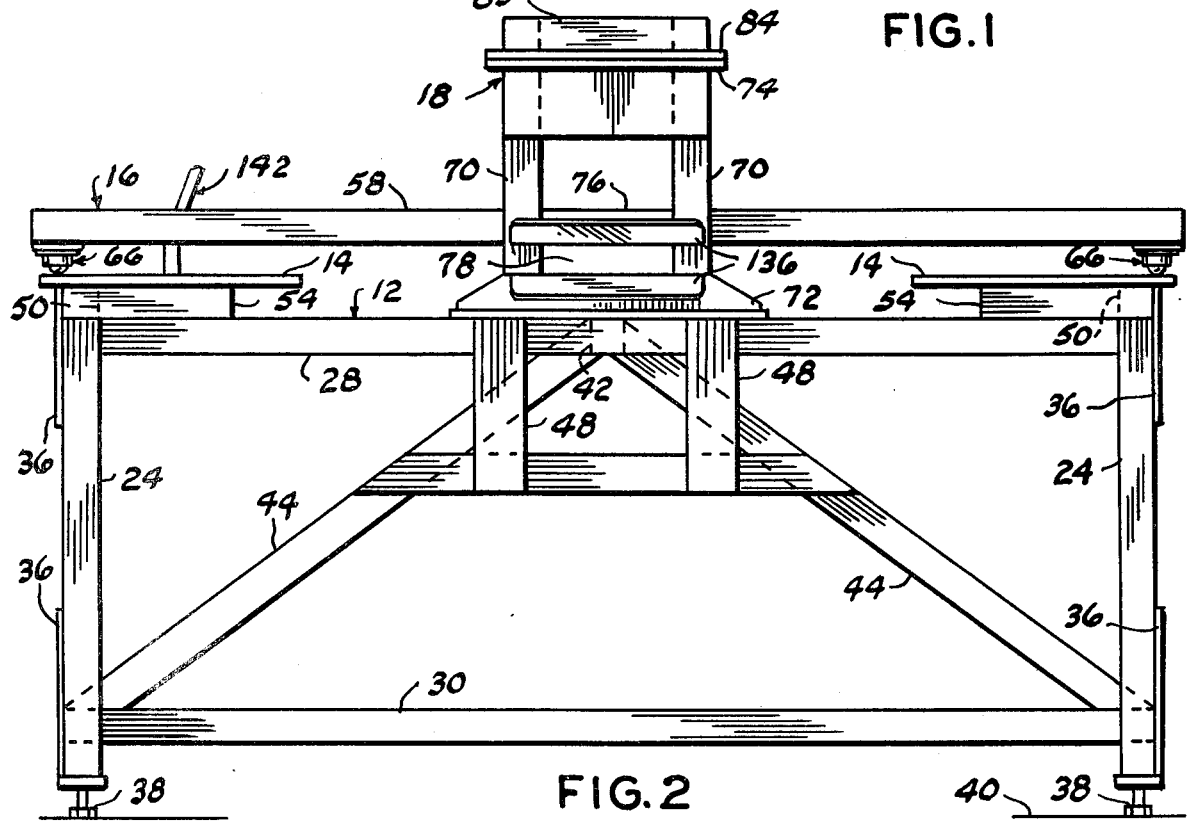
FIG. 2 is a front elevational view.

Like characters of reference designate like parts in those figures of the drawings in which they occur.

In the drawings:

The reference numeral 10 indicates the apparatus, as whole, which is rectangular upright in general configuration. The apparatus 10 comprises rigid frame means 12 horizontally supporting a table-like plate 14 at its respective end portions, a pivotal track assembly 16 overlying and extending between the plates 14, an overhead bridge assembly 18 extending transversely of the frame means medially its ends, turntable bearing means 20 connecting the track assembly with the bridge assembly and a saw cradle assembly 22 reciprocably supported by the track assembly.

Figure 3:
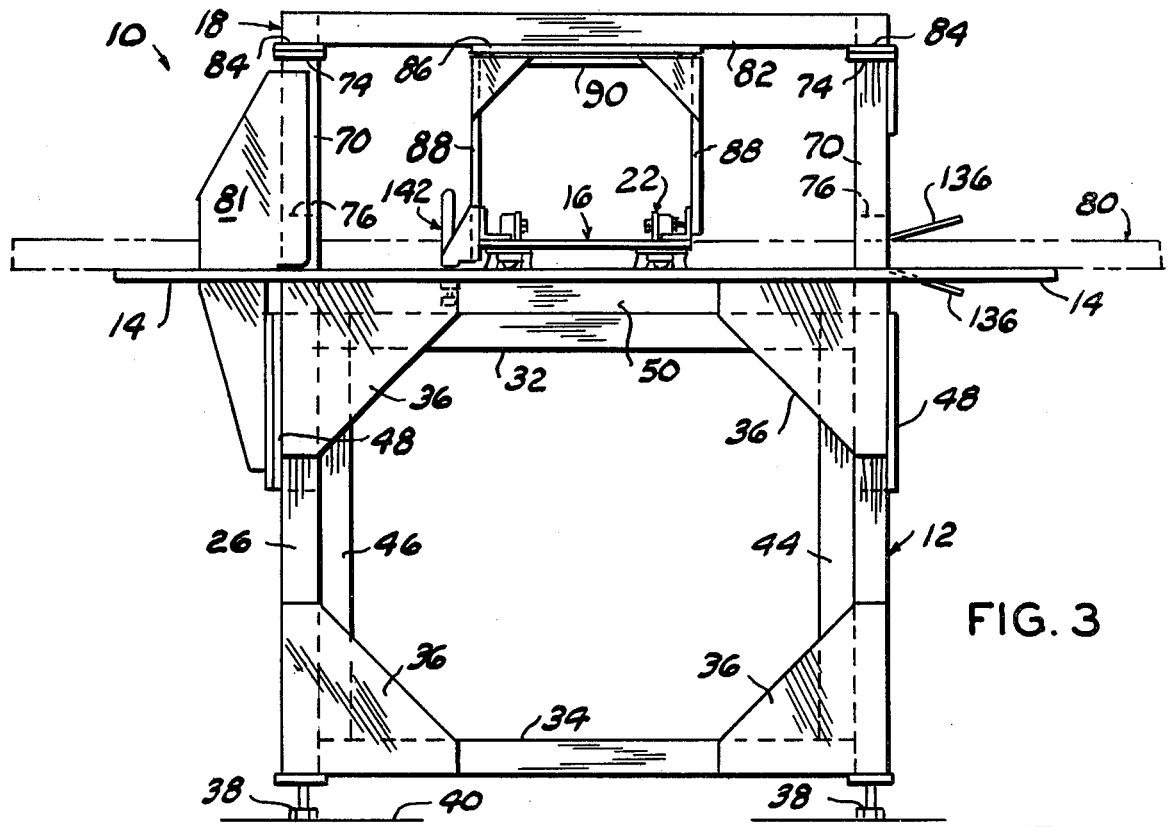
FIG. 3 is a left end elevational view.

The frame means 12 is preferably formed from square tubing and comprises a pair of forward legs 24 and a pair of rearward legs 26, only one being shown (FIG. 3), interconnected at their respective ends by horizontal upper and lower forward and rearward side pieces 28 and 30, respectively, and upper and lower end pieces 32 and 34. The legs and respective end pieces are joined and braced by suitable gussets 36 at respective frame corner portions at the ends of the frame. The frame legs are each provided with a frame leveling foot bolt 38 resting on a base or foundation 40. A frame cross brace 42 extends horizontally between the upper forward and rearward side piece 28 medially their ends. Forward and rearward pairs of braces 44 and 46 extend angularly between the lower end rails 34 and the cross brace 42. Forward and rearward post support pads 48 extend between and are secured to the upper front and rear side members 28 and the angular braces 44 and 46. Plate supporting end pieces 50 are coextensive with and overlie the respective frame upper end piece 32.

The track assembly support plates 14 are generally crescent-shape in plan view and extend transversely of the frame 12 on the upper end pieces 50 with the arcuate concave surfaces 52 of the plates arranged in confronting relation. Side risers 54 are interposed between the lower surface of the plates at the respective end portions of the frame upper forward and rearward side pieces 28 for supporting respective end portions of the plates 14.

Figure 6:
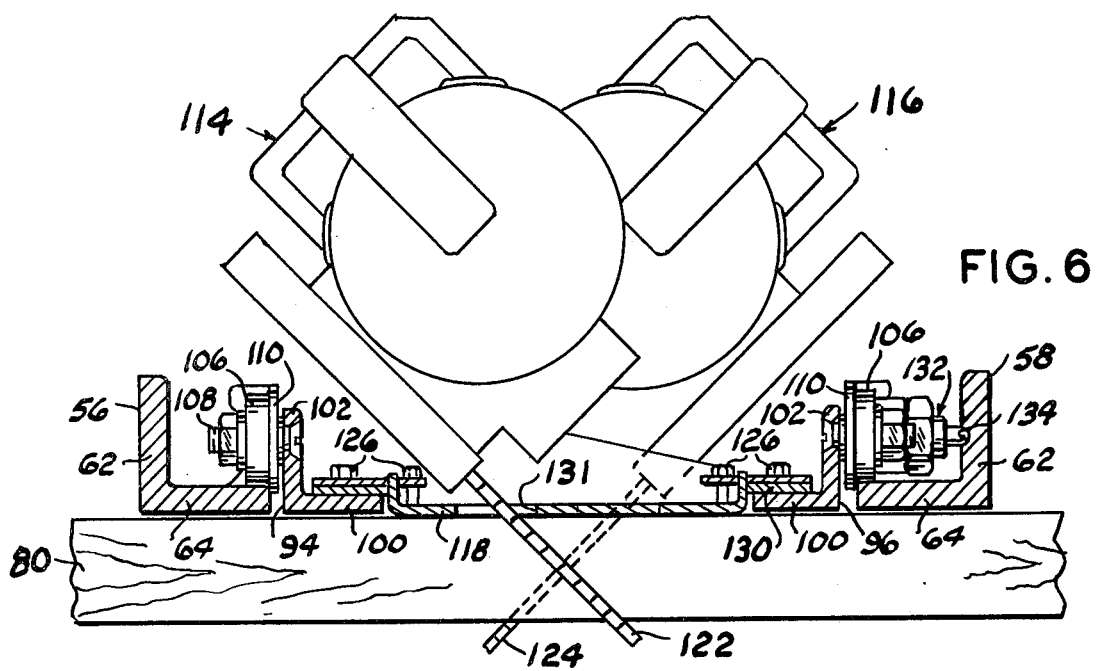
FIG. 6 is a verticle cross sectional view, to a further enlarged scale, taken substantially along the line 6—6 of FIG. 5, with the saw blades angularly inclined and illustrating the relative position of a workpiece.
Figure 9:
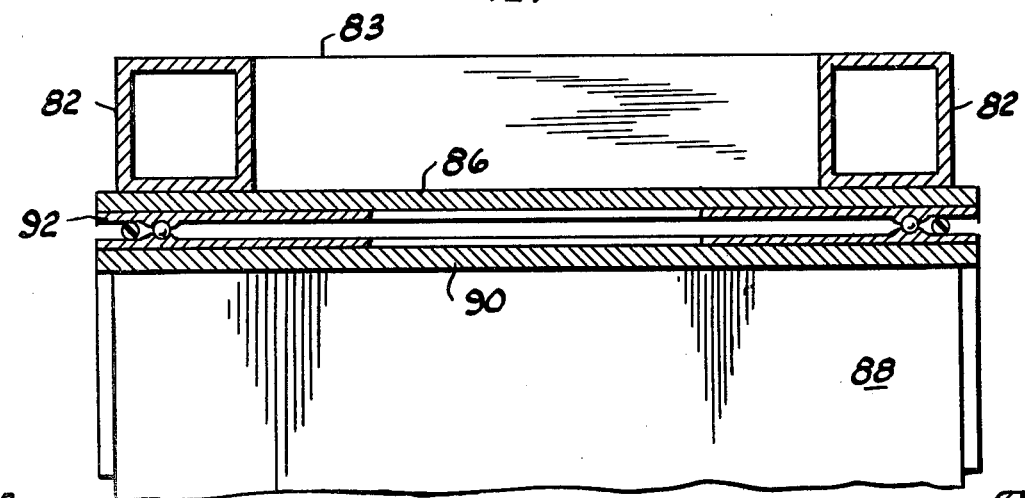
FIGS. 8 and 9 are fragmentary vertical cross sectional views, to another scale, taken substantially along the lines 8—8 and 9—9 of FIG. 1; and, FIG. 10 is a perspective view of a workpiece having angular cuts on its respective ends formed by the saws when in the position illustrated by FIG. 6.
Figure 8:
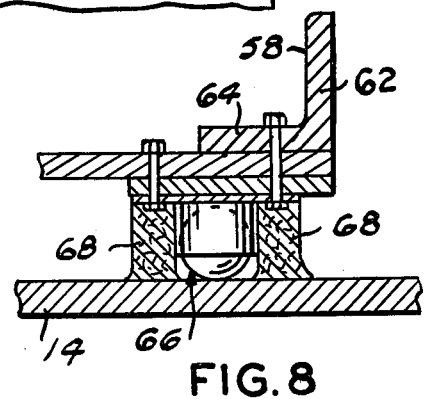

The track assembly 16 comprises a pair of angle iron tracks 56 and 58 substantially coextensive with the spacing between the opposite outer limits of the plates 14 longitudinally of the frame and are interconnected in parallel selected spaced relation by track end plates 60. Each of the tracks 56 and 58 have one flange 62 vertically disposed end and its other flange 64 horizontally disposed and arranged in confronting relation (FIGS. 1 and 6). The respective ends of the track assembly 16 are supported for limited horizontal pivoting movement on the plates 14, in the direction of the arrows 65, by pairs of ball casters 66, only one being shown in detail (FIG. 8). The ball casters 66 are each provided with felt wipers 68 interposed between the track assembly and the upper surface of the respective plate 14 for removing sawdust or workpiece particles from the plates in the path of movement of the respective caster, as presently explained.

The bridge assembly 18 comprises upright parallel spaced-apart posts 70 resting on a post base 72 overlying the frame upper front and rear rails 28 and interconnected at their upper limit by post top plates 74. A stationary bar 76 extends horizontally between the posts 70, substantially in the plane of the track assembly tracks 56 and 58, to define a workpiece opening or path 78 through which a workpiece 80 (FIGS. 1, 3 and 10) is inserted to extend transversely of the frame in underlying relation with respect to the track assembly 16. Vertically disposed plate-like braces 81 secure the rearward posts 70 to the frame rearward upper rail 28 and support pads 48. The bridge assembly further includes a pair of horizontal spaced-apart girders 82 substantially coextensive with the front to back dimension of the frame 12 and are interconnected at their respective ends by spreader bars 83 and girder plates 84 overlying and secured to the post plate 74. Intermediate their ends, the girders 82 have a substantially square bearing plate 86 extending between and secured to their depending surfaces medially their ends.

The track assembly means 16 further includes a pair of upright side plates 88 secured at their depending ends to the tracks 56 and 58 medially their ends and are joined at their upper ends by a track assembly top plate 90 coextensive with and underlying the bridge assembly bearing plate 86. A turntable bearing 92 is interposed between the bridge bearing plate 86 and track assembly top plate 90 and defines a vertical axis centrally of the frame about which the track assembly 16 and saw cradle assembly 22 are angularly pivoted within the end limits of the bridge assembly, as presently explained.

The saw cradle assembly 22 similarly comprises a pair of spaced-apart angle iron rails 94 and 96 of selected length, substantially less than the length of the track assembly 16, which are interconnected at their respective ends in parallel spaced relation by cradle end cross pieces 98 secured to the respective horizontally disposed confronting rail flange 100, the respective other rail flange 102 being vertically disposed. The spacing between the rails 94 and 96 is slightly less than the spacing between the track assembly track flanges 64 for the purpose presently apparent.

Figure 4:
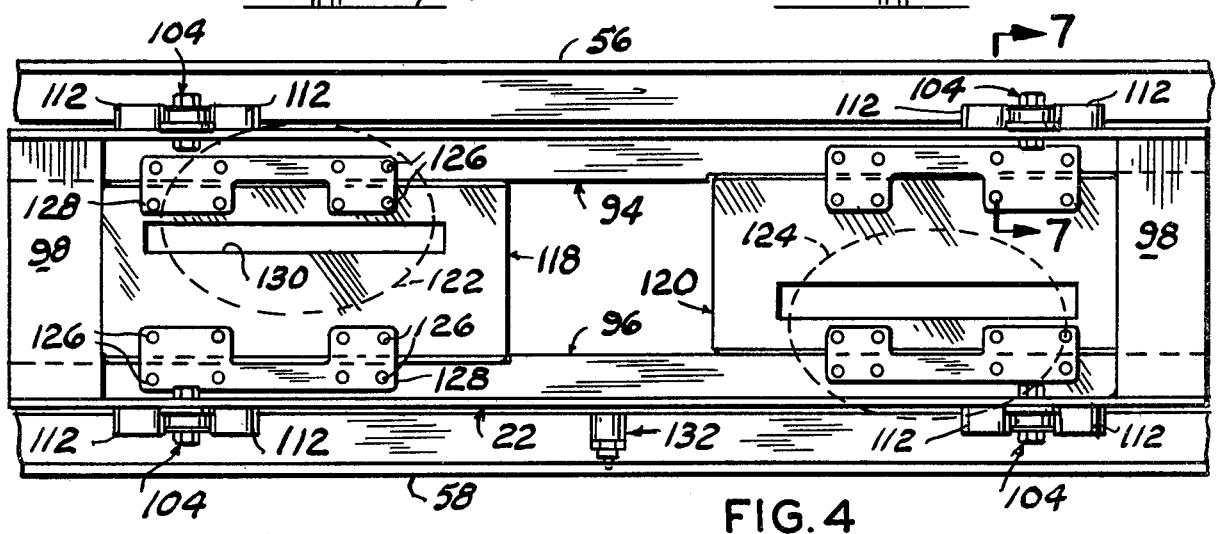
FIG. 4 is a top view, to a larger scale, of the saw cradle and miter saw shoe plates supported by a fragment of its supporting tracks with the miter saws removed and illustrating, by dotted lines, the position of the saw blades when disposed at an angle of 45°.
Figure 5:
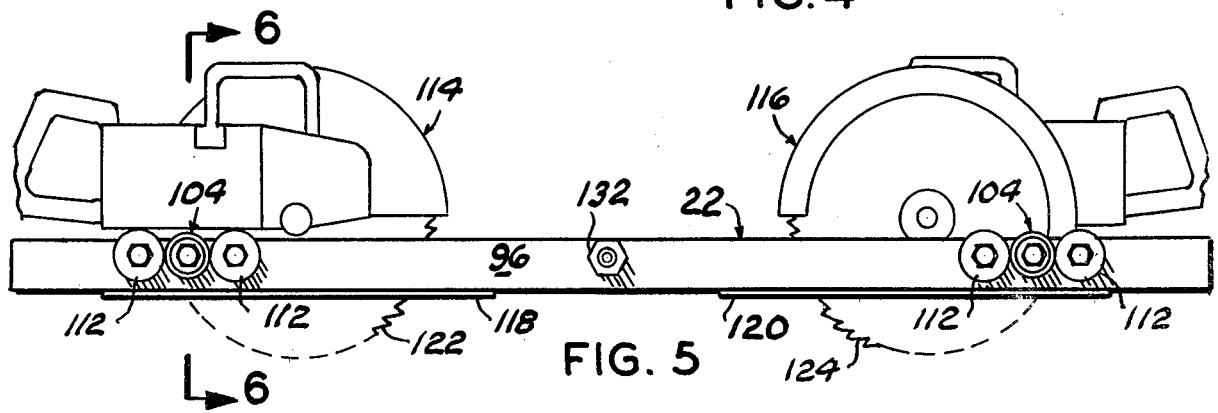
FIG. 5 is a side elevational view of the saw cradle supporting a pair of miter saws.

The cradle assembly 22 is supported on the track flanges 64 by a plurality, four in the example shown, of roller means 104 which are identical and only one is described in detail. The roller means 104 comprises a flanged radial bearing 106 (FIGS. 4, 5 and 6) journalled by horizontal bolt means 108 secured to the rail upright flange 102. The flange 110 of the respective radial bearing is interposed between the adjacent surfaces of the track flange 64 and upright rail flange 102 and acts as a guide in maintaining the cradle assembly rails equally positioned between the tracks 56 and 58 during reciprocating movement of the cradle assembly, as presently explained.

Figure 7:
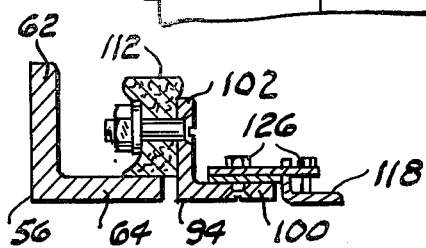
FIG. 7 is a fragmentary vertical cross sectional view, to a different scale, taken substantially along the line 7—7 of FIG. 4.

A pair of track wiper pads 112 (FIG. 7) are secured to the rail upright flange 102 adjacent each radial flanged bearing 106 in the path of its to and fro movement for the purpose of removing sawdust or wood particles from the upper surface of the respective track flange to insure contact of the flanged bearing with the rail flange when processing the workpiece, as presently explained.

The saw cradle assembly supports a pair of conventional portable handle equipped electric hand saws in spaced-apart confronting relation longitudinally of the cradle assembly rails 94 and 96. In the example shown, the portable saws 114 and 116 are of the type presently marketed under the Trademark Skilsaw No. 77, which include shoe plates 118 and 120 through which circular blades 122 and 124 project downwardly of the depending plane of the cradle rails 94 and 96. Since the mounting of the saws 114 and 116, on the cradle rails 94 and 96, is substantially identical, only the mounting of the saw shoe plate 118 is described in detail. The shoe plate 118 is removed from the saw 114 and drilled for receiving a plurality of bolts 126 extending through a plate clamp 128 securing the shoe plate 118 to the rail flanges 100 adjacent the cradle cross piece 98 with suitable spacers 30 interposed between the plate clamps 128 and rail flanges 100 to dispose the depending surface of the shoe 118 adjacent the upper surface of the workpiece 80 (FIG. 6). The saws 114 and 116 are then secured to their respective shoes 118 and 120 with the blades projecting through the respective saw shoe plate slot 131.

The saw cradle further includes a spring urged detent 132 laterally secured to the upstanding flange 102 of the rail 96 medially its ends. A suitable recess 134 is formed in the adjacent surface of the track flange 62 of the track 58 medially its ends for the purpose of receiving the detent 132 and centering the cradle assembly 22 with respect to the track assembly 16 and dispose the saw blades 122 and 124 on opposing sides of the workpiece receiving path 78 prior to receiving and processing the workpiece.

The track assembly turntable bearing 92 is pre-loaded to insure free horizontal pivoting movement of the track assembly and insure clearance of the saw shoe plates with respect to the workpiece 80 and prevent any vertical movement of the track assembly toward and away from the bridge assembly while the saws are processing the workpiece 80. This is accomplished by inserting suitable spacers, not shown, between the ball caster mounts and track end plates 60 and between the post and bridge assembly plates 74 and 84.

OPERATION

With the device assembled as described hereinabove, the saws 114 and 116 are, in the example shown (FIGS. 4 and 6), tilted on their respective shoe plate to dispose the plane of the respective blades at an angle of 45°. The workpiece 80 is longitudinally inserted into the workpiece path 78 where it is to be acted upon intermediate its ends and its selected cutoff point can be visually observed between the respective saws at the vertical center of the framework.

Workpieces to be processed are sometimes irregular, commonly referred to as warped, not shown, and to facilitate entry of such a workpiece into the workpiece path 78, upper and lower panel-like deflectors 136 are secured to the forward post legs 70 and project angularly upward and downward forwardly of the frame (FIGS. 1 and 3) for guiding a warped workpiece into the workpiece path.

A workman, standing at either end of the frame 12, manually positions the track assembly at a desired angular position with respect to the workpiece. To facilitate this angular position of the track assembly, angular positions are indicated by lines 138 scored on the upper surface of the plates 14 so that a center line 140 scored on each of the track end plates 60 may be aligned with one of the angular score lines 138. Obviously, a full miter gage, indicating degree indicia, not shown, may be scored on the upper surface of the plates 14, if desired, for cutting any selected angle on the workpiece.

Figure 10:
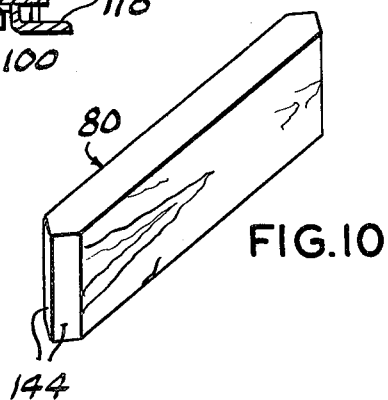

The track assembly 16 is secured in its selected angular position by conventional C-type toggle link clamp means 142 secured to one of the tracks, for example, the track 56, which, when actuated, locks the track assembly to the adjacent plate 14. Thereafter, the workman, by grasping the adjacent saw handle, manually reciprocates the saw cradle 22, with the saws energized, in a to and fro direction longitudinally of the track assembly which forms compound 45° angle cuts, indicated by the surfaces 144, on the workpiece 80 (FIG. 10). Thereafter, the cradle assembly 22 is centered longitudinally of the track assembly by the detent 132 entering the track recess 134 for movement of the workpiece to another cutoff position.

Obviously the invention is susceptible to changes or alterations without defeating its practicability. Therefore, I do not wish to be confined to the preferred embodiment shown in the drawings and described herein.

I claim:

1. A miter saw guide for forming miter cuts on a workpiece, comprising:
   upright rigid frame means having opposing sides and end portions;
   a horizontal track plate transversely overlying the respective frame means end portion;
   bridge means overlying said frame means in vertically spaced relation medially its end portions for defining a horizontal workpiece supporting travel path extending transversely of said frame means;
   track means extending longitudinally of said frame means in overlying relation with respect to said workpiece travel path and said track plates for horizontal pivoting movement in opposing directions with respect to the longitudinal axis of the workpiece travel path;
   turntable bearing means centrally interposed between and connecting said track means with said bridge means for defining a vertical pivoting axis for said track means;
   cradle means supported by said track means for reciprocating movement between its respective ends; and,
   at least one electric hand saw supported by said cradle means.

2. The saw guide according to claim 1 in which said track means includes:
   at least one friction reducing ball caster interposed between the respective end portion of said track means and the respective said track plate.

3. The saw guide according to claim 2 in which said track means includes a pair of spaced-apart tracks and said cradle means includes:
   a pair of spaced-apart parallel rails interposed between said tracks; and,
   pairs of radial flanged bearing means journalled by each said rail in longitudinal spaced relation for supporting said rails on the respective track of said pair of tracks.

4. The saw guide according to claim 3 in which said saw includes a shoe plate and further including:
   plate clamps and bolt means connecting said shoe plate to the respective said rail.

5. The saw guide according to claim 4 in which said turntable bearing means includes:
   an upstanding side plate secured to each said track medially its ends; and,
   vertically aligned turntable bearing plates horizontally secured, respectively, to the upper limit of said side plates and the depending surface of said bridge means.

6. The saw guide according to claim 5 in which said track means further includes:
   toggle link clamp means secured to one end portion of one said track for anchoring said track means to one said track plate in a selected angular position relative to the workpiece travel path.

7. The saw guide according to claim 6 in which said cradle means supports a pair of electric hand saws in longitudinal space confronting relation, whereby compound angular cuts are formed on the end of a workpiece by longitudinal to and fro movement of said cradle means.

8. The saw guide according to claim 7 and further including:
   detent means connected with one said rail and engageable with the adjacent said track for centering said cradle means with respect to said track means following to and fro movement of the cradle means.

9. The saw guide according to claim 6 and further including:
   wiper means interposed in the travel path of said ball casters and said radial flanged bearings, respectively.

10. The saw guide according to claim 1 in which said cradle means supports a pair of electric hand saws in longitudinal spaced confronting relation, whereby compound angular cuts are formed on the end of a workpiece by longitudinal to and fro movement of said cradle means.

* * * * *